(12) United States Patent (10) Patent No.: US 9,254,590 B2
Park (45) Date of Patent: Feb. 9, 2016

(54) METHOD FOR PREPARING FABRIC-INTEGRATED CROSS-LINKED FOAMED PRODUCT

(76) Inventor: Jang Won Park, Busan (KR)

( * ) Notice: Subject to any disclaimer, the term of this patent is extended or adjusted under 35 U.S.C. 154(b) by 657 days.

(21) Appl. No.: 13/704,195

(22) PCT Filed: Mar. 29, 2011

(86) PCT No.: PCT/KR2011/002141
§ 371 (c)(1),
(2), (4) Date: Dec. 13, 2012

(87) PCT Pub. No.: WO2011/159015
PCT Pub. Date: Dec. 22, 2011

(65) Prior Publication Data
US 2013/0207290 A1 Aug. 15, 2013

(30) Foreign Application Priority Data

Jun. 16, 2010 (KR) .................. 10-2010-0057090
Mar. 11, 2011 (KR) .................. 10-2011-0021758

(51) Int. Cl.
*B29C 47/92* (2006.01)
*B29C 44/02* (2006.01)
*B29C 43/02* (2006.01)
*B29C 43/14* (2006.01)
*B29C 43/18* (2006.01)
*B29C 44/12* (2006.01)
*B29C 44/58* (2006.01)
*B29C 44/14* (2006.01)
*B29C 44/34* (2006.01)

(52) U.S. Cl.
CPC ............. *B29C 44/025* (2013.01); *B29C 43/021* (2013.01); *B29C 43/145* (2013.01); *B29C 43/18* (2013.01); *B29C 44/1209* (2013.01); *B29C 44/14* (2013.01); *B29C 44/3488* (2013.01); *B29C 44/586* (2013.01)

(58) Field of Classification Search
CPC ........ B29C 44/12; B29C 43/28; B29C 44/025
USPC ........................................................ 264/40.4
See application file for complete search history.

(56) References Cited

U.S. PATENT DOCUMENTS 6,743,325 B1 6/2004 Taylor
7,276,191 B2 10/2007 Park
(Continued)

FOREIGN PATENT DOCUMENTS

JP 2001-277400 A 10/2001
JP 2006-528258 A 12/2006
(Continued)

*Primary Examiner* — Joseph S Del Sole
*Assistant Examiner* — John Robitaille
(74) *Attorney, Agent, or Firm* — Birch, Stewart, Kolasch & Birch, LLP

(57) ABSTRACT

The present invention relates to a method for manufacturing a fabric-integrated cross-linked foamed product, comprising the steps: preparing a mold having a cavity; filling the cavity of the mold with a molding material in an amount greater than the volume of the cavity of the mold; pressurizing and heating the mold; releasing pressure before the molding material of the mold begins to be cross-linked after having reached the softening point by the applied heat, and opening the mold; completely removing the molding material other than the molding material charged in the cavity of the mold, of the molten molding material in the opened mold; placing fabric on the upper surface of the mold the cavity of which is filled with the molding material; pressurizing and heating the mold to cross-link the molding material in contact with the fabric; and releasing pressure and rapidly opening the mold to foam the cross-linked molding material in contact with the fabric.

26 Claims, 8 Drawing Sheets

(56) References Cited

U.S. PATENT DOCUMENTS

| 8,231,756 | B2* | 7/2012 | Kim ............ A41D 31/005 156/247 |
|---|---|---|---|
| 2002/0018876 | A1 | 2/2002 | Matsuki et al. |
| 2008/0113143 | A1 | 5/2008 | Taylor |
| 2010/0139853 | A1 | 6/2010 | Park |

FOREIGN PATENT DOCUMENTS

| KR | 2001-0017382 A | 3/2001 |
|---|---|---|
| KR | 20-0271380 Y1 | 4/2002 |
| KR | 10-0618383 B1 | 8/2006 |
| WO | 2005/063864 A1 | 7/2005 |

\* cited by examiner

METHOD FOR PREPARING FABRIC-INTEGRATED CROSS-LINKED FOAMED PRODUCT

TECHNICAL FIELD

The present invention relates to a method of manufacturing a cross-linked foam product, and more particularly to a method of manufacturing a cross-linked foam product having fabric and a foam body integrated with each other, comprising preparing a mold having a cavity engraved in an arbitrary shape; filling the cavity of the mold with a molding material in an amount greater than the volume of the cavity of the mold; pressurizing and heating the mold; releasing pressure before the molding material of the mold begins to be cross-linked after having reached the softening point by the applied heat, and opening the mold; completely removing the molding material other than the molding material charged in the cavity of the mold, of the molten molding material in the opened mold; placing fabric on the upper surface of the mold the cavity of which is filled with the molding material; pressurizing and heating the mold to cross-link the molding material in contact with the fabric; and releasing pressure and rapidly opening the mold to foam the cross-linked molding material in contact with the fabric.

BACKGROUND ART

Anti-shock cushioning products having various shapes are used in sports and a variety of safety fields. In order to recently cope with the increasing demand for wearability, bendability and breathability of cushioning products, the designs of materials and structures thereof are variously changed. In the production of cushioning products, cross-linked foams resulting from a series of chemical pressurizing, cross-linking and foaming are receiving more and more attention from the related manufacturers with regard to their material use. Methods of manufacturing a variety of personnel protection products using such cross-linked foams are variously proposed, and examples thereof include Korean Unexamined Patent Application Publication No. 2001-0017382, U.S. Pat. No. 6,743,325, and US Publication No. 2008-0113143.

Specifically, Korean Unexamined Patent Application Publication No. 2001-0017382 discloses a method of manufacturing a shin guard, by sequentially stacking fabric, an EVA cross-linked foam, and non-woven fabric, adhering them using an adhesive, and pressing them to form a molded body having a predetermined shape, which is then formed to have a variety of irregular shapes, and U.S. Pat. No. 6,743,325 discloses a method of manufacturing a guard in such a manner that closed cell polyethylene foam is attached at a predetermined size and interval to the upper surface of resiliently stretchable knitted fabric using a rolling cutter acting as a cutting knife and a jig by means of a heat-resistant hot-melt adhesive.

US Publication No. 2008-0113143 discloses an attachment method comprising subjecting two kinds of cross-linked foams having different properties to flame lamination at 370° C. or higher thus preparing a cross-linked foam having composite properties, which is then attached to the upper surface of resiliently 2- or 4-way stretchable knitted fabric using a rolling cutter acting as a cutting knife and a jig and a heat-resistant hot-melt adhesive under conditions of predetermined shape, size, and interval of the cross-linked foam being maintained.

Such conventional techniques are common in that the cross-linked foam in a single sheet shape having a predetermined size or in a sheet roll shape having a predetermined thickness is prepared, and then subjected to a series of subsequent processes, thus producing a variety of cushioning products such as cushioning pads, etc. However, in the case where the cushioning product is manufactured from the cross-linked foam in a sheet shape or a sheet roll shape, many limitations are imposed on the structures or numbers of the products because of use of a plurality of foams having an arbitrary shape obtained by cutting the foam in a planar sheet shape or a sheet roll shape using any cutting means.

Also, when these foams are used by being attached to fabric or being embedded in fabric, they cannot appropriately correspond to a variety of bending areas (or a variety of operations) of the human body. Even in the case where they are applied to specific products having a three-dimensional shape to form inherent bending at a specific portion, many problems must be overcome to thoroughly solve the above problem. Thus, the conventional techniques are limited in terms of stretchability, bendability and curved fitting to a target as composite characteristics required of cushioning products, and may also obstruct the flexible activity of the human body, and thus there are needs for fundamental alternatives therefor.

According to conventional methods proposed to improve bending flexibility and air permeability of products to which the cross-linked foams in a sheet or sheet roll shape are individually cut and attached, a plurality of individual cross-linked foams separated using a cutting process may be attached to one surface of fabric by predetermined intervals. Thus, cushioning products may be maximally improved in bendability, and because only fabric is provided in spaces between the foams which are individually cut and attached to the upper surface of fabric, air may naturally flow through the protection pad, ultimately increasing air permeability of products.

However, this method is problematic because a large number of processes are required to uniformly attach (or adhere) the plurality of cross-linked foams to a predetermined portion of one surface of fabric, and thereby additional costs are incurred, and thus this method cannot be actually applied to general-purpose products. When these products are used for a long period of time in a state of being worn by a user or they are washed, the individual cross-linked foams attached to the surface of the fabric using the adhesive may be partially detached from the adhesion surface of the fabric, and thus they may be limitedly used only for products in which durability is ensured in a predetermined range.

Furthermore, because practical limitation factors are accompanied by the process of firmly attaching individually discrete cross-linked foams to the surface of fabric, the outer surface of the cushioning product formed by combining the plurality of cross-linked foams becomes typically planar. Thus, to make a cushioning product the outer surface of which is formed to have three-dimensional designs in various shapes, a plurality of individual cross-linked foams having a variety of three-dimensional shapes and dimensions is prepared and then attached to the surface of fabric using an adhesive. In this case, a plurality of molds is prepared so as to be adapted for individual foams having intended designs in three-dimensional shapes, as well as the complicated processes, after which individual foams are formed and then effectively attached to the upper surface of fabric. However, this case has many processing limitations and increased manufacturing costs, making it difficult to achieve the desired products.

Furthermore, in the conventional techniques, the cross-linked foams and the fabric are mainly bonded to each other using a sewing process or an adhesive. Particularly in the case of using an adhesive, a large number of processes should be conducted, including washing the adhesion surface, and applying a primer and an adhesive thereon, followed by performing drying and then compressing or heating the adhesive before compression, etc. Moreover, when a liquid adhesive is excessively used, it may penetrate into the fabric. The case where an adhesive is used in a minimum amount needs an industrial adhesive containing an organic solvent, as necessary, in order to ensure strong adhesion between the fabric and the cross-linked foam, undesirably causing many environmental problems.

DISCLOSURE

Technical Problem

Accordingly, the present invention has been made keeping in mind the above problems occurring in the related art, and an object of the present invention is to provide a method of manufacturing a fabric-integrated cross-linked foam product, in which a plurality of individual cross-linked foams may be provided on the surface of fabric without material overflowing at edges thereof.

Another object of the present invention is to provide a method of manufacturing a fabric-integrated cross-linked foam product, in which, without limitations of geometric and material characteristics of a molding material, the color boundaries between cross-linked foams having different colors may be visibly clearly separated, or the material boundaries between the cross-linked foams and the fabric may be clearly separated.

Still another object of the present invention is to provide a method of manufacturing a fabric-integrated cross-linked foam product, in which fabric and a cross-linked foam may be integrated with each other using only cross-linking and foaming, without cutting the cross-linked foam into a predetermined shape using a cutting knife and attaching it to the upper surface of fabric using an adhesive.

Yet another object of the present invention is to provide a method of manufacturing a fabric-integrated cross-linked foam product, in which, without limitation in the shape of a mold and various factors of a molding material, any cross-linked foam having a predetermined thickness and design may be integrated with fabric.

Technical Solution

In order to accomplish the above objects, a technical feature of the present invention is to include preparing a mold having a cavity engraved in an arbitrary shape; filling the cavity of the mold with a molding material in an amount greater than a volume of the cavity of the mold; pressurizing and heating the mold; releasing pressure between when the molding material of the mold reaches a softening temperature by applied heat and when the molding material begins to be cross-linked, and opening the mold; completely removing the molding material other than the molding material charged in the cavity of the mold, of the melted molding material in the opened mold; placing fabric on an upper surface of the mold having the cavity filled with the molding material; pressurizing and heating the mold so that the molding material in contact with the fabric is cross-linked; and releasing pressure and rapidly opening the mold so as to foam the cross-linked molding material in contact with the fabric.

Another technical feature of the present invention is to include preparing a mold having a plurality of cavities engraved in an arbitrary shape; filling some of the cavities of the mold with a first molding material in an amount greater than a volume of some cavities of the mold; pressurizing and heating the mold; releasing pressure between when the first molding material of the mold reaches a softening temperature by applied heat and when the first molding material begins to be cross-linked, and opening the mold; completely removing the first molding material other than the first molding material charged in the cavities of the mold, of the melted first molding material in the opened mold; filling empty cavities of the mold, which are not filled with the melted first molding material, with a second molding material having a different color or different color or properties from the first molding material; pressurizing and heating the mold; releasing pressure between when the second molding material reaches a softening temperature by applied heat and when the second molding material begins to be cross-linked, and opening the mold; completely removing the second molding material other than the second molding material charged in the cavities of the mold, of the melted second molding material in the opened mold; placing fabric on an upper surface of the mold having the cavities filled with the first molding material and the second molding material; pressurizing and heating the mold so that the first molding material and the second molding material which are in contact with the fabric are cross-linked simultaneously; and releasing pressure and rapidly opening the mold so as to foam the cross-linked first and second molding materials in contact with the fabric.

Still another technical feature of the present invention is to include preparing at least two first molds having cavities engraved in an arbitrary shape; filling the cavities of the first molds with a molding material in an amount greater than a volume of the cavities of the first molds; pressurizing and heating the first molds; releasing pressure between when the molding material of the first molds reaches a softening temperature by applied heat and when the molding material of the first molds begins to be cross-linked, and opening the first molds; completely removing the molding material other than the molding material charged in the cavities of the first molds, of the melted molding material in the opened first molds; disposing the first molds having the cavities filled with the molding material in cavities having an arbitrary shape of a second mold; placing fabric on an upper surface of the first molds having the cavities filled with the molding material and disposed in the cavities of the second mold; pressurizing and heating the second mold so that the molding material of the first molds in contact with the fabric is simultaneously cross-linked; and releasing pressure and rapidly opening the second mold so as to simultaneously foam the cross-linked molding material of the first molds in contact with the fabric.

Yet another technical feature of the present invention is to include preparing at least two molds having cavities engraved in an arbitrary shape; filling the cavities of the respective molds with molding materials having different colors or different colors or properties in an amount greater than a volume of the cavities of the molds; pressurizing and heating the molds; releasing pressure between when the molding materials of the molds reach a softening temperature by applied heat and when the molding materials of the molds begin to be cross-linked, and opening the molds; completely removing the molding materials other than the molding materials charged in the cavities of the molds, of the melted molding materials in the opened molds; placing fabric on an upper surface of any one of the molds having the cavities filled with the molding materials; combining the molds so that the molding materials charged in the cavities face each other while the fabric is disposed therebetween; pressurizing and heating the combined molds so that the molding materials of the molds which are in contact with the fabric are cross-linked simultaneously; and releasing pressure and rapidly opening the combined molds so as to simultaneously foam the cross-linked molding materials of the molds in contact with the fabric.

As such, the molding material of each of the first molds may have a different color or different color or properties.

The method may further comprise providing a release means before heating the mold filled with the molding material, and removing the release means after opening the mold.

Also, the method may further comprise providing a release means before heating the mold filled with the first molding material, and removing the release means after opening the mold having the melted first molding material.

Also, the method may further comprise providing a release means before heating the mold filled with the first molding material and the second molding material, and removing the release means after opening the mold having the melted first molding material and second molding material.

Also, the method may further comprise providing a release means before heating the first molds filled with the molding material, and removing the release means after opening the first molds.

The removing the molding material other than the molding material charged in the cavity of the opened mold may be performed by maintaining the mold at a predetermined temperature or by cooling the mold and then using a removing means at a high temperature.

Also, the removing the first molding material or the second molding material other than the first molding material or the second molding material charged in the cavities of the opened mold may be performed by maintaining the mold at a predetermined temperature or by cooling the mold and then using a removing means at a high temperature.

Also, the removing the molding material other than the molding material charged in the cavities of the opened first molds may be performed by maintaining the first molds at a predetermined temperature or by cooling the first molds and then using a removing means at a high temperature.

The method may further comprise providing a fabric protection means between the mold and the fabric before placing the fabric.

Also, the method may further comprise providing an adhesion means between the molding material and the fabric before placing the fabric.

The filling the cavities of the mold with the first molding material and the second molding material may be performed by filling some of the cavities of the mold with the first molding material in an amount smaller than the volume of some cavities, and charging the second molding material in all of the cavities which are not filled with the first molding material and the cavities which are partially filled with the first molding material.

Advantageous Effects

According to the present invention, a mold is opened when a molding material having a specific color or specific color and properties begins to be cross-linked, thus effectively removing only the molding material located at unnecessary positions other than intended cavities of the mold, whereby a cross-linked foam product having high quality with various colors and designs can be provided on fabric, without the use of an adhesive or sewing as in conventional techniques.

Also, according to the present invention, instead of introducing a molding material which was already weighed into a mold so as to be cross-linked and foamed, when intended cavities of a mold are completely filled with a molding material which is melted, the unnecessary molding material is removed and then cross-linking and foaming are performed, thereby providing a fabric-integrated cross-linked foam product, in which, without limitations in the geometric and material characteristics of the molding material on the surface of fabric, the color boundaries between cross-linked bodies having different colors can be visibly clearly separated, or the material boundaries between the cross-linked foams and the fabric can be clearly separated.

Also, according to the present invention, a molding material can naturally penetrate into the texture of fabric during a cross-linking process, and can be foamed in a state of being integrated with the fabric, thereby providing a fabric-integrated cross-linked foam product having high adhesion durability even without the use of an additional adhesive.

Also, according to the present invention, even when cross-linked foams have designs in very complicated shapes, they can be easily integratedly provided to the surface of fabric using a single foaming process, without complicated procedures required to cut cross-linked foams which were already formed and attach them to fabric.

BEST MODE

A detailed description will be given of preferred embodiments of the present invention with reference to the appended drawings. In the following description, it is to be noted that a detailed description of portions which are not directly related with the technical features of the present invention or which are known well to those skilled in the art, and overlapping portions in embodiments of the invention will be omitted.

Figure 1:
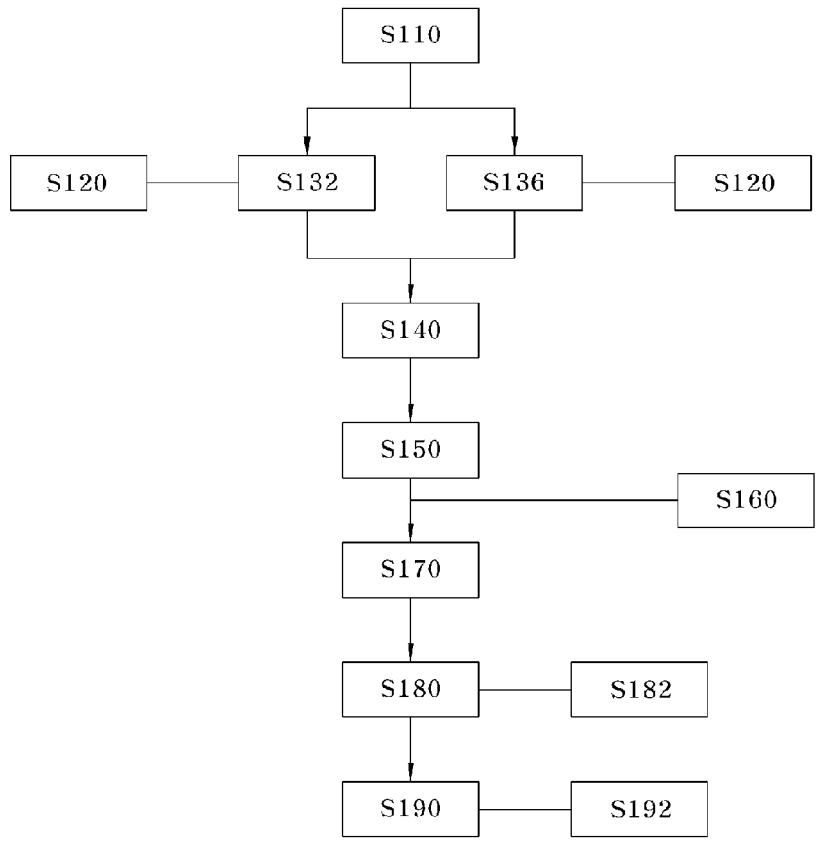
FIG. 1 schematically illustrates a manufacturing process according to an embodiment of the present invention.

FIG. 1 illustrates a process of manufacturing a fabric-integrated cross-linked foam product according to a preferred embodiment of the present invention. As illustrated in this drawing, the method of the invention includes preparing a mold (S110), filling the mold with a molding material (S132, S136), heating the mold (S140), opening the mold (S150), removing some of the molding material (S170), placing fabric (S180), and cross-linking and foaming the molding material in contact with the fabric, along with the fabric (S190).

The inside of the mold is provided with an inner space having an arbitrary shape. The inner space of the mold is a cavity which is filled with molding materials which will be described later, and is preferably formed in intaglio. According to the present invention, the mold may have a cavity or a plurality of cavities, having a single shape, depending on the number of cavities, and the cavity may be provided in a variety of shapes, including a planar shape, a three-dimensional shape, and combinations thereof, depending on the structure thereof.

In the case where the cavity of the mold is formed in a three-dimensional shape, the mold may be provided in the form of a typical mold having a cavity in which the inner space is engraved in a three-dimensional shape, and of a mold composite including a mold core having a three-dimensional shape and having a cavity engraved in an arbitrary shape on the surface thereof and a mold body coupled with the mold core and having, on the inner surface thereof, a cavity corresponding to the outer surface shape except for the cavity in the mold core. In the case where the mold has a plurality of cavities, these cavities may be connected to each other, or any one or more selected from among the plurality of cavities may be formed to be separated from the remaining cavities, or all of the plurality of cavities may be formed to be separated from each other. The foregoing is merely illustrative, and the present invention is not limited thereto.

Figure 2:
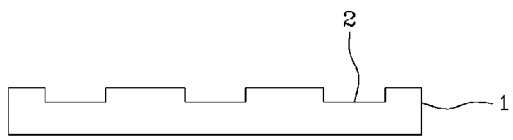
FIGS. 2 to 6 schematically illustrate some procedures of the process of FIG. 1.

The cavity of the mold which may be provided in various shapes is preferably formed to have the same contour as a final cross-linked foam product. More preferably, taking into sufficient consideration the foaming rate of a molding material which penetrates into the surface and texture of fabric and the stretchability of fabric in diverse directions upon foaming, the cavity is formed at a size reduced at a predetermined ratio relative to the size of a final foamed product. Meanwhile, in the present invention, because cross-linking and foaming should be conducted in a state of fabric being placed inside the mold, the depth of the cavity is preferably determined in consideration of the thickness, etc., of fabric differently selected depending on the type of product. Thus, the present invention does not exclude a case where the cavity structure of the mold includes a first cavity on which fabric is placed and a second cavity formed in intaglio on the surface of the first cavity so that a molding material is charged therein. FIG. 2 illustrates a mold 1 in which a plurality of individual cavities 2 is formed.

Figure 3:
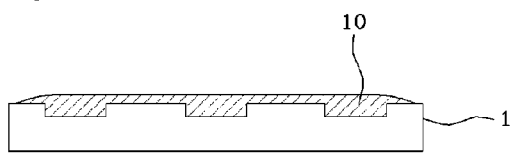

After preparation of the mold, as illustrated in FIG. 3, the cavities of the mold are filled with a molding material 10 having any color and type. The volume (amount) of the molding material which is charged in the cavities is preferably set to be greater than the volume of the cavities of the mold as shown in this drawing. According to the present invention, filling the cavities of the mold with the molding material may include the following two cases. One of them is that the mold is opened and the molding material is directly charged in the cavities (S132). In this case, the material used is preferably in a solid phase. When the material in a solid phase is provided, its shape may be formed to correspond to the shape of cavities.

The other is that the mold is closed and the cavities thereof are filled with the molding material using a device, such as a material injector, etc., of an injection machine (S136). In this case, the material in a solid phase is heated at a low temperature and softened in the temperature range at which cross-linking is suppressed by a heating means provided in the device, and then fed into the cavities via the material inlet and the material passage of the closed mold. In the present invention, the amount of the molding material, which is directly charged in the cavities of the mold or is fed via the device, is not limited so long as it is greater than the volume of the cavities, and may be arbitrarily determined depending on the type of product. This is considerably different from a conventional method in which when a product having multiple colors is integratedly cross-linked and foamed, the volume of the cavities of the mold adapted for different colors and the amount of the molding material which is charged therein must be exactly equal to each other without a precise deviation range.

According to the present invention, the molding material is provided in the form of a solid-phase mixture comprising, as widely known in the related art, a base resin, a cross-linking agent and a foaming agent, and if necessary, further comprising a pigment, a filler and other additives, etc., added so as to be suitable for end uses and purposes of foamed products. When the molding material is prepared, the mixing ratio of additional materials with respect to the base resin (base polymer) and the mixing process may be variously embodied depending on the end uses and purposes of products by those having corresponding knowledge in the art.

The molding material (which is the concept including both a first molding material and a second molding material which will be described later) according to the present invention is preferably formed by using any one selected from among the following solid synthetic resins (solid polymers) as the base resin.

An example of the base resin includes any one selected from among a variety of olefin-based polymers and copolymers, or combinations thereof. Examples of the olefin-based solid synthetic resin copolymer may include an ethylene/alpha-olefin copolymer, an ethylene/vinyl acetate copolymer (EVA), an ethylene/vinyl ester copolymer (EVE), an ethylene/ethyl acrylate copolymer (EEA), an ethylene/methyl acrylate (EMA), an ethylenealkyl/acrylate copolymer (EAA), an ethylene/polypropylene copolymer (EPM), a low-density polyethylene polymer (LDPE), a polypropylene polymer (PP), etc.

Another example of the base resin includes any one selected from among a variety of solid synthetic rubbers and natural rubbers, or combinations thereof. Examples of the solid synthetic rubber copolymer may include polybutadiene rubber (BR), styrene butadiene rubber (SBR), acrylonitrile-butadiene rubber (NBR), isoprene rubber (IR), ethylene propylene diene rubber (EPDM), polysiloxane (silicone rubber, SR), polychloroprene rubber (CR), isobutylene isoprene copolymer/butyl rubber (IIR), etc.

A further example of the base resin includes a mixture (A+B) of (A) any one selected from among the olefin-based polymers and copolymers, or combinations thereof, and (B) any one selected from among the solid synthetic rubbers and natural rubbers, or combinations thereof.

After filling of the inner space of the mold with the molding material, the mold is closed so that the charged molding material does not flow out of the mold, and then the mold is pressurized at a predetermined pressure and heated (S140). When heat is continuously applied to the mold, the molding material which is melted by such heat is first charged in the cavities at comparatively lower positions of the mold, and an excess of the melted molding material is positioned on cavity peripheries and surfaces, other than the cavities. That is, the surplus of the molding material which is supplied in an amount greater than the volume of the cavities transgresses the boundaries of the cavities of the mold.

When the molding material arrives at any point of time at which it begins to be cross-linked after having reached the softening temperature by heat which is continuously applied in a state of being pressurized, pressure is released, and the mold is opened (S150). It is preferred that opening the mold be arbitrarily carried out when the molding material is converted to be viscous once it has begun melting after having reached the softening temperature by heat, or between when the molding material is converted into a molten liquid after having reached the melting temperature and when initial cross-linking occurs.

When the solid-phase molding material undergoes a cross-linking procedure after having reached the softening temperature and the melting temperature, respective conditions required for initial cross-linking, middle cross-linking, and final cross-linking may vary depending on the materials of the mixture differently mixed so as to be adapted for a desired final product. In particular, the conditions thereof may vary depending on the heating temperature and time, and the extent of pressurization for the molding material fed into the cavities of the mold. Thus, it is preferred that optimal conditions required for opening the mold be precisely measured depending on the materials of the mixture. In the related industries, preferred conditions may be measured using any one arbitrarily selected from among a variety of devices, in particular, a MDR-2000 rheometer (Alpha Technology Co.) tester.

Figure 4:
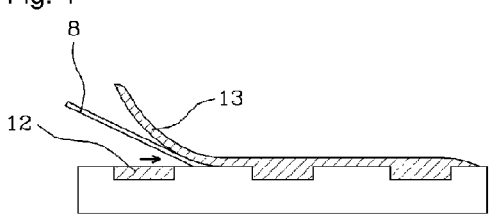

Subsequently, an unnecessary molding material other than the molding material charged in the cavities of the opened mold is completely removed (S170). The removal of the unnecessary molding material according to the present invention may be performed by using either a process of maintaining the mold at a predetermined temperature and removing the melted molding material using a removing means, or a process of cooling the mold so that the molding material converted into a solid phase is removed using a removing means which is heated. In the case where the latter process is adopted, the end of the removing means may be provided with an element able to heat the molding material to a temperature equal to or higher than the lowest softening temperature of the molding material. The removing means may be a knife having a predetermined width. FIG. 4 illustrates S170 at which an excess of the melted molding material 13 which is located at positions other than the cavities is removed using a removing means 8 such as a knife, except for the molding material 12 charged in the cavities of the mold.

After complete removal of the molding material positioned outside the cavities, fabric is placed on the upper surface of the mold the cavities of which are filled with the molding material, and the mold is closed (S180). The fabric according to the present invention may have any structure and texture so long as the melted molding material penetrates or impregnates therein by pressure generated from the inside of the mold in the subsequent cross-linking process. The fabric may include any one selected from among knitted or woven fabric of natural or synthetic substances. Also, the selected fabric is not chosen on account of whether it is stretchable, and thus may have no stretchability or be stretchable in any one or more directions. Furthermore, the present invention does not exclude non-woven fabric made of natural or synthetic substances, natural leather, and synthetic leather made of woven or non-woven fabric so long as the molding material penetrates or impregnates therein, in addition to the above fabric.

Figure 5:
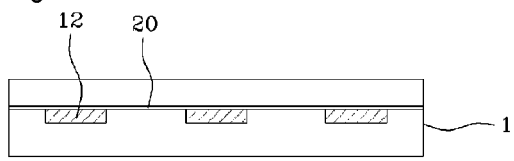

As illustrated in FIG. 5, the fabric 20 is placed on the upper surface of the mold the cavities of which are filled with the molding material 12, and then the mold is closed. Unlike the case illustrated in the drawing, in the case where the fabric is placed on a mold composite comprising a mold core having cavities formed in intaglio on the surface thereof and a mold body coupled with the mold core, it is apparent that the fabric be provided in such a manner that the entire outer surface of the mold core in which the cavities are filled with the softened or melted molding material, or a part of the outer surface including at least the cavities is covered with the fabric.

Figure 6:
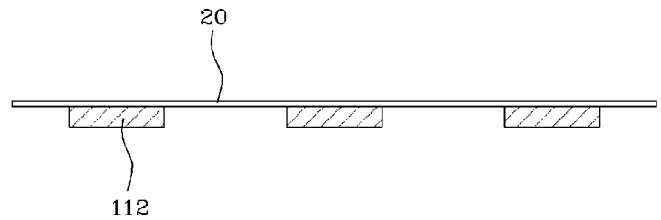

Subsequently, heat is applied to the closed mold which is pressurized so that the molding material in contact with the fabric penetrates into the surface and texture of the fabric. Accordingly, the molding material that penetrates into the surface and texture of the fabric is integratedly attached to the fabric while being integratedly cross-linked. After the molding material is integrated with the fabric via penetration into the surface and texture of the fabric, pressure is released when cross-linking is completed, and the mold is rapidly opened so as to foam the molding material integrated with the fabric (S190). After completion of the foaming process, as illustrated in FIG. 6, a fabric-integrated foamed product is obtained, in which cross-linked foams 112 having an arbitrary shape are provided on the surface of the fabric 20.

The fabric-integrated cross-linked foam product according to the present invention obviates a need for any adhesion means to bind the fabric and the cross-linked foams. Further, there is no color invasion in the outer boundaries between the adjacent cross-linked foams formed on the same surface of the fabric. The reason is that the cavities are filled with the molding material in such a manner that the cavities having an arbitrary shape are completely filled with the molding material converted to be viscous or molten, after which, during the cross-linking process or before completion thereof, the mold is opened, and an excess of the unnecessary molding material is separately removed. This method is considerably different from a conventional method comprising subjecting cross-linked foams which were previously prepared to additional secondary processing including secondary pressing, cutting, etc., so that the foams are attached using sewing or adhesion. Thus, according to the present invention, any product having various designs and colors may be provided in the form of fabric-integrated cross-linked foam products having various shapes, without additional processing, including adhesion, etc., after cross-linking and foaming.

On the other hand, the present invention may comprise the steps of providing a release means (S120) before the mold filled with the molding material is heated (S140), and removing the release means (S160) after the mold is opened. The release means is used to easily separate the melted molding material from the inner surface of the cavities of the mold when the mold is opened. In the case where the molding material is in a solid phase, it is preferred that the release means be provided after the molding material is charged in the cavities. In the case where the softened molding material is fed using a material injector of the injection machine, the release means is preferably provided before the molding material is fed into the cavities of the closed mold. Examples of the release means include a highly releasable film, a release resin applied on a part of the molding material charged in the inner space of the mold or fabric, etc. which are merely illustrative. Any means may be selectively used so long as it prevents strong adhesion between the inner surface of the mold and the molding material and it ensures rapid approachability to the surface of the melted molding material converted to be viscous.

In regard to the fabric placed inside the mold, the surface of the fabric other than the surface in contact with the molding material (which is a surface opposite the surface in contact with the melted molding material) may be damaged by heat continuously applied from the surface of the mold during the cross-linking process. Hence, the present invention may include the steps of providing a fabric protection means between the fabric and the inner surface of the mold (S182) after the fabric is placed on the mold, and removing the fabric protection means (S192) after the mold is finally opened to perform foaming. Examples of the fabric protection means include a heat-resistant resin film, a molded material, fabric or a heat-resistant resin applied on a part of the fabric, which are merely illustrative. Any means may be selectively used so as to be adapted for a desired product.

Also, in order to enhance the extent of adhesion between the fabric and the molding material, the present invention may include a step of providing an adhesion means between the molding material and the fabric before the fabric is placed on the upper surface of the molding material. The adhesion means may enhance the adhesive force between the fabric and the molding material in the course of cross-linking and foaming, and any means may be selectively used and the shape thereof is not limited.

Figure 7:
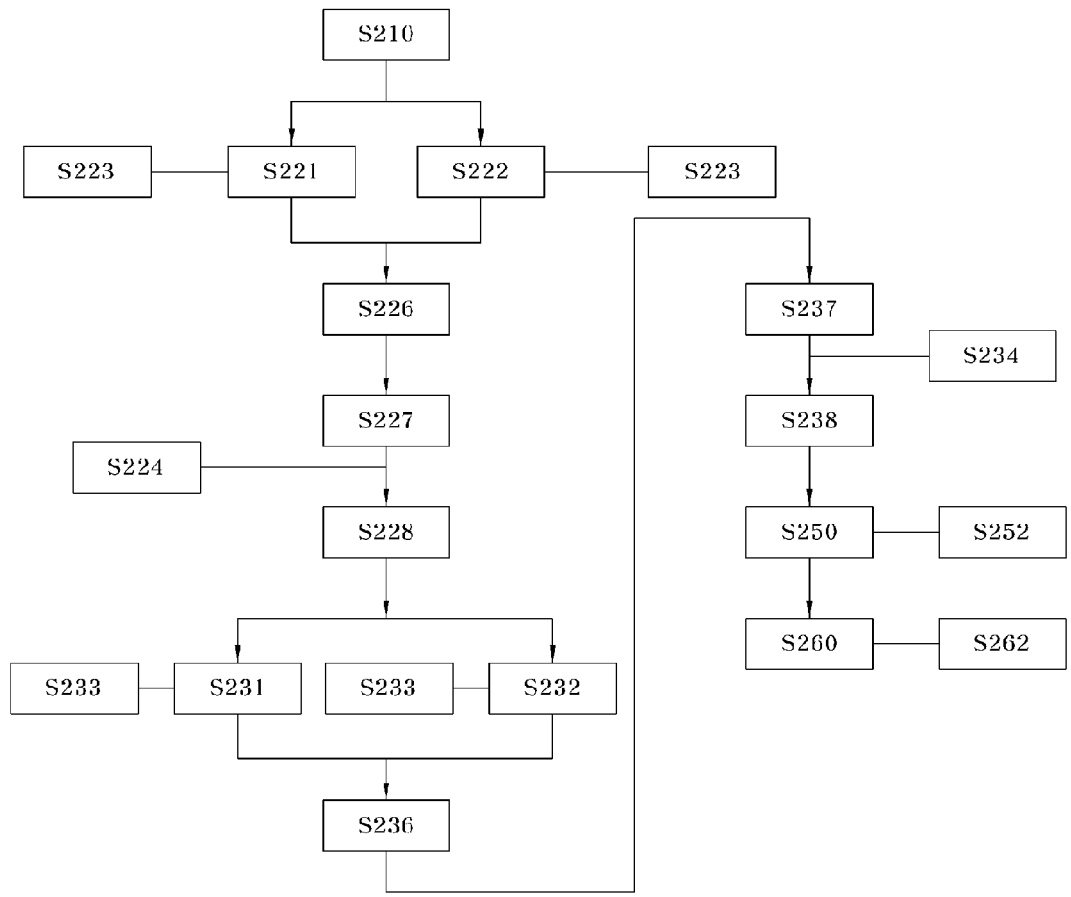
FIG. 7 schematically illustrates a manufacturing process according to another embodiment of the present invention.

FIG. 7 illustrates a process of manufacturing a fabric-integrated cross-linked foam product according to another preferred embodiment of the present invention. This embodiment provides a method of easily manufacturing a product including cross-linked foams having multiple colors and properties on the surface of fabric using a single mold. A description of portions of this embodiment, which overlap with the above-mentioned embodiment or to which the description portions of the above-mentioned embodiment may be applied as they are, is omitted.

Figure 8:
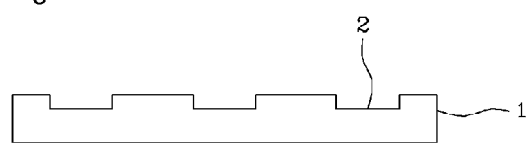
FIGS. 8 to 14 schematically illustrate some procedures of the process of FIG. 7.
Figure 9:
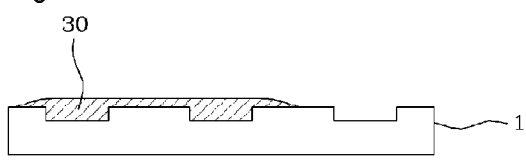

As illustrated in FIG. 8, a mold 1 having cavities 2 therein is prepared (S210). After preparation of the mold, as illustrated in FIG. 9, some of the cavities of the mold are filled with a first molding material 30 having any color. As such, it is absolutely arbitrary to select the cavities. A process of filling the selected cavities with the first molding material may be divided into a case where the first molding material is in a solid phase (S221), and a case where the first molding material in a solid phase is heated and softened (S222), the description of which is the same as above.

Figure 10:
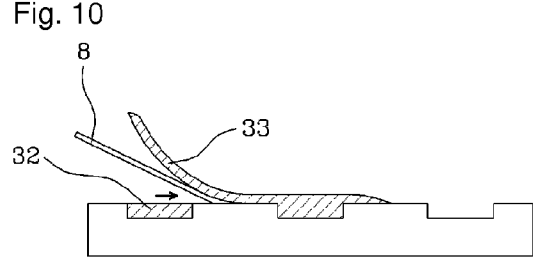

After filling of the selected cavities with the first molding material, the mold is closed and then pressurized and heated so that the first molding material is melted (S226), and after complete filling of the selected cavities with the melted first molding material, pressure is released between when the first molding material reaches the softening temperature and when the first molding material begins to be cross-linked, and the mold is opened (S227). Subsequently, an excess of the first molding material located at positions other than the selected cavities in the opened mold is removed (S228). FIG. 10 illustrates a procedure of removing an excess of the unnecessary first molding material 33 which is melted, other than the first molding material 32 charged in the selected cavities, using a removing means 8.

Figure 11:
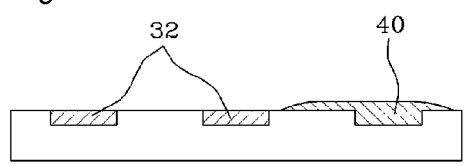

After removal of an excess of the melted first molding material, as illustrated in FIG. 11, the remaining cavity, which is not filled with the molten first molding material, is filled with a second molding material 40 having a color different from that of the first molding material or different color and properties, and the mold is closed and pressurized and heated so that the second molding material is melted (S236). A process of filling the remaining cavity of the mold with the second molding material having a different color may be divided into a case where the second molding material is in a solid phase (S231), and a case where the second molding material in a solid phase is heated and softened (S232), the description of which is the same as above.

Figure 12:
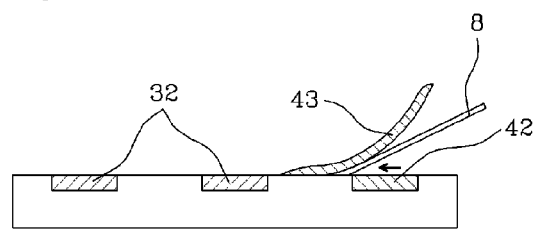
Figure 13:
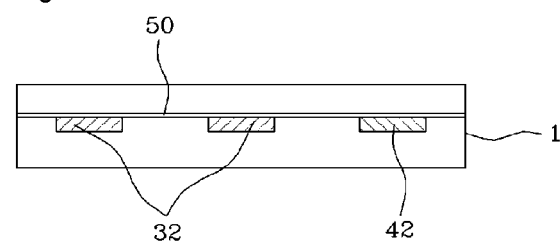

After complete filling of the remaining cavity, other than the cavities filled with the first molding material, with the second molding material which is melted after having reached the softening temperature by the applied heat, the mold is opened between when the first molding material and the second molding material reach the softening temperature and when the first molding material and the second molding material begin to be cross-linked (S237). As illustrated in FIG. 12, an excess of the second molding material 43, which is located at positions other than the selected cavity 42, is removed using a removing means 8 (S238). Subsequently, as illustrated in FIG. 13, fabric 50 is placed on the upper surface of the mold the cavities of which are filled with the first molding material 32 and the second molding material 42, and the mold is closed (S250).

Figure 14:
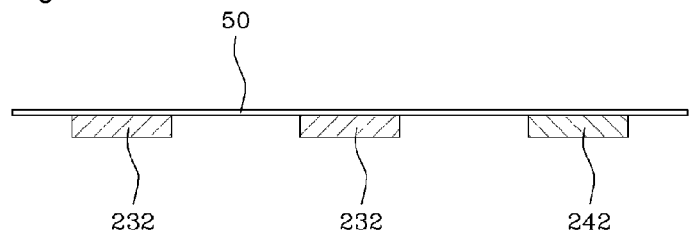

After the mold is closed, the mold is pressurized and heated so that the first molding material and the second molding material which are in contact with the fabric penetrate into the surface and texture of the fabric. Accordingly, the molding materials that penetrate into the surface and texture of the fabric and the cavities of the mold are integratedly attached to the fabric while being integratedly cross-linked. After the molding materials are integrated with the fabric via penetration into the surface and texture of the fabric, pressure is released when cross-linking is completed, and the mold is rapidly opened so as to foam the molding materials integrated with the fabric (S260). After completion of the foaming process, as illustrated in FIG. 14, a fabric-integrated foamed product is obtained, in which cross-linked foams 232, 242 formed in an arbitrary shape and having various colors and properties are provided on the surface of the fabric 50.

As in the above-mentioned embodiment, this embodiment may include providing a release means before the mold filled with the molding materials is heated, and removing the release means after the mold is opened. Specifically, providing the release means (S223, S233) may be performed upon either or both of charging the first molding material (S221, S222) and charging the second molding material (S231, S232), and the specific sequence of providing the release means may vary depending on the characteristics (solid phase or softened state) of the first molding material, as mentioned above. After the release means is provided, it is preferred that removing the release means (S224, S234) be conducted after S227 and S237 at which the mold is opened.

Also, in order to protect the fabric placed inside the mold from the applied heat, this embodiment may include providing a fabric protection means between the fabric and the inner surface of the mold (S252) after the fabric is placed on the mold, and also removing the fabric protection means (S262) after the mold is finally opened so as to perform foaming.

Also, in order to enhance the extent of adhesion between the fabric and the molding materials, this embodiment may include providing an adhesion means between the molding materials and the fabric before the fabric is placed on the upper surface of the molding materials.

Figure 15:
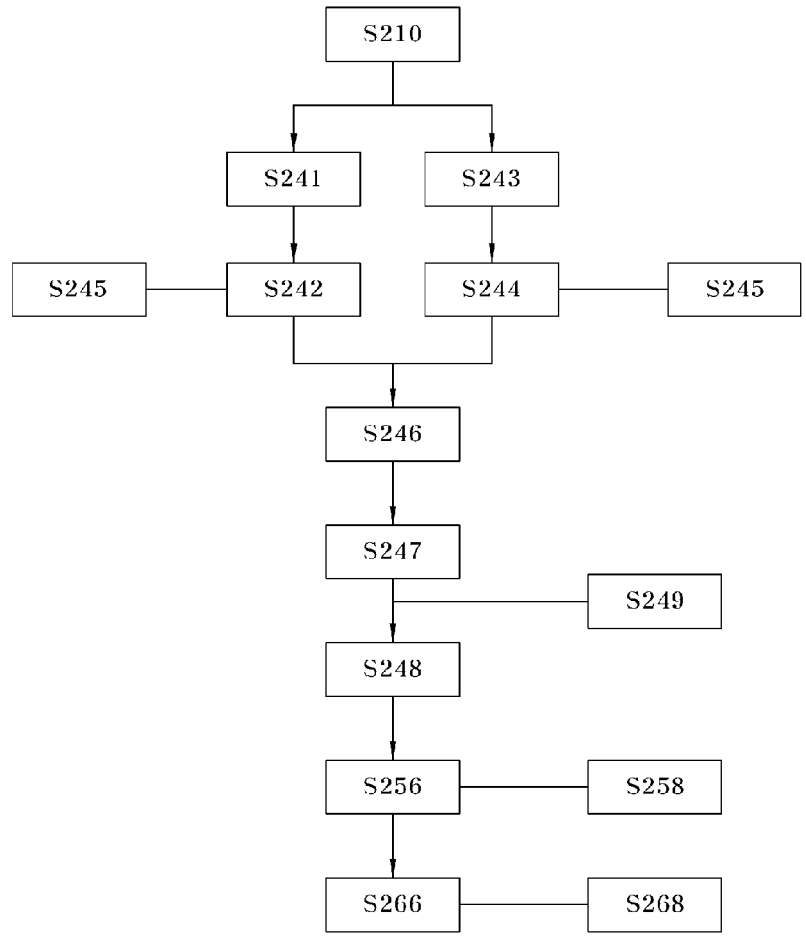
FIG. 15 schematically illustrates a manufacturing process according to still another embodiment of the present invention.

In addition, FIG. 15 illustrates a process of manufacturing a fabric-integrated cross-linked foam product according to still another preferred embodiment of the present invention. This embodiment provides a method of easily manufacturing a product including cross-linked foams having various colors and properties on the surface of fabric, using a single mold, like the above-mentioned embodiment, and a difference from the above-mentioned embodiment is that the same cavities are filled with different molding materials to form cross-linked foams. A description of portions of this embodiment, which overlap with the above-mentioned embodiment or to which the description portions of the above-mentioned embodiment may be applied as they are, is omitted.

Figure 16:
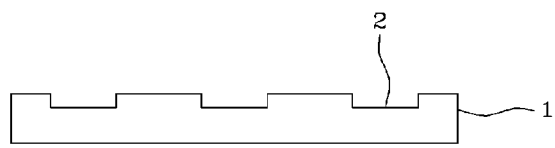
FIGS. 16 to 21 schematically illustrate some procedures of the process of FIG. 15.
Figure 17:
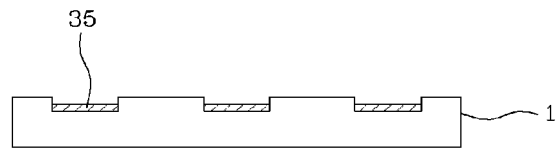

As illustrated in FIG. 16, a mold 1 having cavities 2 therein is prepared (S210). After preparation of the mold, the cavities of the mold are filled with a first molding material having any color. In this embodiment, when the cavities are filled with the first molding material, the first molding material may be used in an amount smaller than the volume of the cavities. That is, all the cavities may be filled with the first molding material in an amount smaller than the volume of each of the cavities, or alternatively, some of the cavities of the mold may be selected and then filled with the first molding material in an amount smaller than the volume of each of the selected cavities. FIG. 17 illustrates the former case in which the first molding material 35 is charged in all the cavities. A process of filling the cavities with the first molding material is divided into a case where the first molding material is in a solid phase (S241), and a case where the first molding material in a solid phase is heated and softened (S243), the description of which is the same as above.

After filling of the cavities with the first molding material in an amount smaller than the volume of the cavities, a second molding material is charged in an amount greater than the remaining volume of the cavities on the first molding material. That is, in the case where the first molding material is charged in all the cavities of the mold, the second molding material is charged in an amount greater than the remaining volume of the cavities other than the volume occupied by the first molding material in the entire volume of the cavities. Unlike this, if the first molding material is charged in some of the cavities of the mold, the second molding material is charged in an amount greater than the volume of the cavities in all of the cavities having the first molding material and empty cavities having no first molding material.

Figure 18:
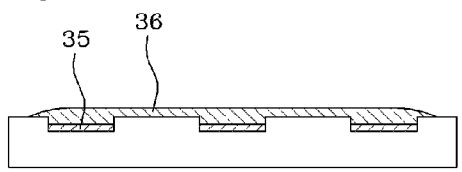

The second molding material may be different in terms of properties, or colors and properties, from the first molding material. FIG. 18 illustrates a case where the first molding material 35 is charged in all the cavities and the second molding material 36 is placed thereon. A process of filling the cavities with the second molding material may be divided into, as in the first molding material, a case where the second molding material is in a solid phase (S242), and a case where the second molding material in a solid phase is heated and softened (S244), the description of which is the same as above. As necessary, the present invention does not exclude filling the cavities of the mold with the first molding material and the second molding material through S241 and S244, or filling the cavities of the mold with the first molding material and the second molding material through S243 and S242.

Figure 19:
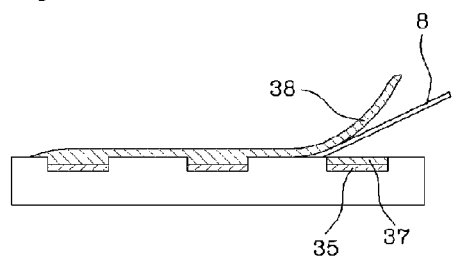

After filling of the cavities with the first molding material and the second molding material, the mold is closed and pressurized and heated so that the first molding material and the second molding material are melted at the same time (S246), and after complete filling of the cavities with the melted molding materials, pressure is released when the first molding material and the second molding material begin to be cross-linked after having reached the softening temperature, and the mold is opened (S247). Subsequently, an excess of the second molding material which is located at positions other than the cavities in the opened mold is removed (S248). FIG. 19 illustrates a procedure of removing an excess of the unnecessary second molding material 38 which is melted, other than the first molding material 35 and the second molding material 37 charged in the cavities, using a removing means 8.

Figure 20:
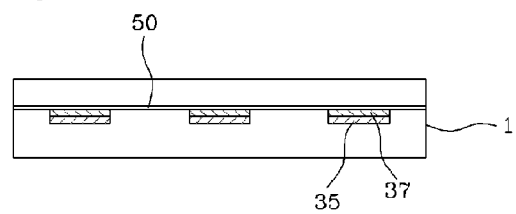

After removal of an excess of the second molding material, as illustrated in FIG. 20, fabric 50 is placed on the upper surface of the mold the cavities of which are filled with the first molding material 35 and the second molding material 37 and the mold is closed (S256). After the mold is closed, the mold is pressurized and heated so that the second molding material penetrates into the surface and texture of the fabric, and simultaneously the first molding material and the second molding material which are in contact with each other are cross-linked. Accordingly, the second molding material is integratedly cross-linked with the first molding material and the second molding material is integratedly attached to the fabric.

Figure 21:
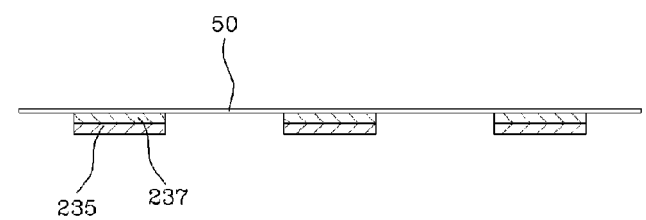

After the molding materials are integratedly cross-linked and the second molding material is integrated with the fabric via penetration into the surface and texture of the fabric, pressure is released when cross-linking is completed, and the mold is rapidly opened so that the molding materials integrated with the fabric are foamed (S266). After completion of the foaming process, as illustrated in FIG. 21, a fabric-integrated foamed product is obtained, in which cross-linked foamed bodies 235, 237 formed in an arbitrary shape and having various colors and properties are provided on the surface of the fabric 50.

This embodiment may include providing a release means before the mold filled with the second molding material is heated, and removing the release means after the mold is opened, as in the above-mentioned embodiment. Specifically, it is preferred that providing the release means (S245) be performed upon charging the second molding material (S242, S244), and removing the release means (S249) be performed after S247 at which the mold is opened.

Also, in order to protect the fabric placed inside the mold from the applied heat, this embodiment does not exclude providing a fabric protection means between the fabric and the inner surface of the mold (S258) after the fabric is placed on the mold, and removing the fabric protection means (S268) after the mold is finally opened so as to perform foaming.

Also, in order to enhance the extent of adhesion between the fabric and the molding material, this embodiment may include providing an additional adhesion means between the molding material and the fabric before the fabric is placed on the upper surface of the molding material.

Figure 22:
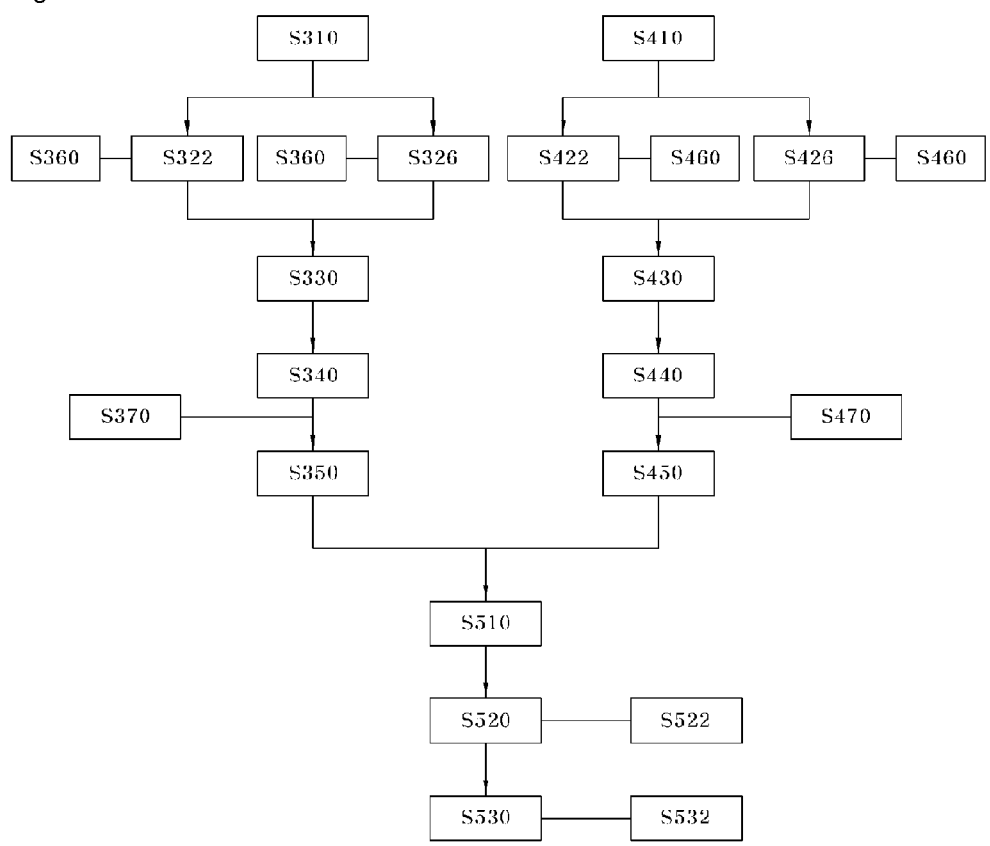
FIG. 22 schematically illustrates a manufacturing process according to yet another embodiment of the present invention.

FIG. 22 illustrates a process of manufacturing a fabric-integrated cross-linked foamed product according to yet another preferred embodiment of the present invention. This embodiment is different from the above-mentioned embodiment because a product having cross-linked foamed bodies having various colors and properties on the surface of fabric may be manufactured using multiple molds. A description of portions of this embodiment, which overlap with the above-mentioned embodiment or to which the description portions of the above-mentioned embodiment may be applied as they are, is omitted.

Figure 23:
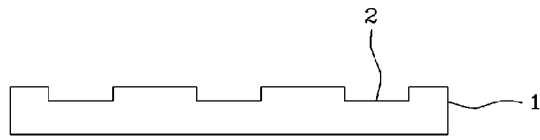
FIGS. 23 to 31 schematically illustrate some procedures of the process of FIG. 22.
Figure 26:
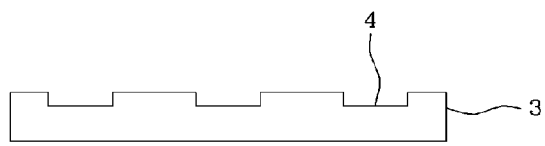

A plurality of first molds having cavities in an arbitrary shape is prepared (S310, S410). As illustrated in FIGS. 23 and 26, two molds 1, 3 having cavities 2, 4 therein are prepared. As such, it is apparent that the cavities of the prepared molds have different shapes, unlike the above.

Figure 24:
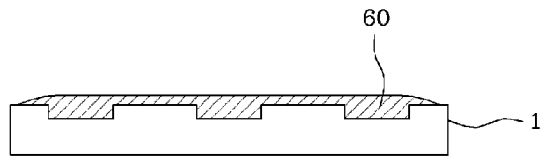
Figure 27:
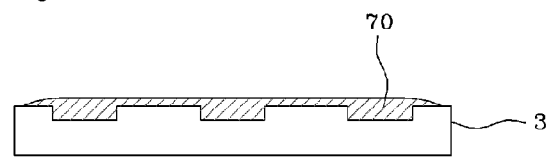

After preparation of the molds, as illustrated in FIGS. 24 and 27, molding materials 60, 70 are charged in the cavities of the molds. The molding materials charged in the cavities of the molds preferably have different colors or different colors and properties. A process of filling the cavities with the molding materials may be divided into a case where the molding materials are in a solid phase (S322, S422), and a case where the molding materials in a solid phase are heated and softened (S326, S426), the description of which is the same as above.

Figure 25:
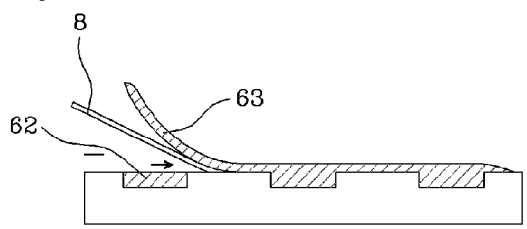
Figure 28:
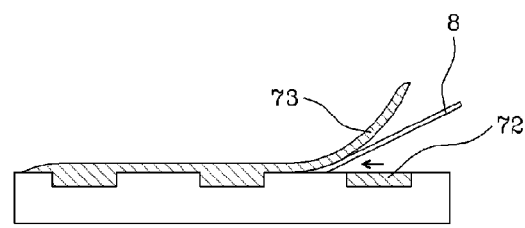

After filling of the cavities of the molds with the molding materials, the molds are closed and then pressurized and heated so that the molding materials are melted (S330, S430), and after complete filling of the cavities of the molds with the melted molding materials, the molds are opened when the molding materials inside the molds begin to be cross-linked after having reached the softening temperature (S340, S440), and an excess of the molding materials which are located at positions other than the cavities of the molds are removed (S350, S450). As illustrated in FIGS. 25 and 28, an excess of unnecessary molding materials 63, 73 which are melted, other than the molding materials 62, 72 charged in the cavities, are removed using a removing means 8.

Figure 29:
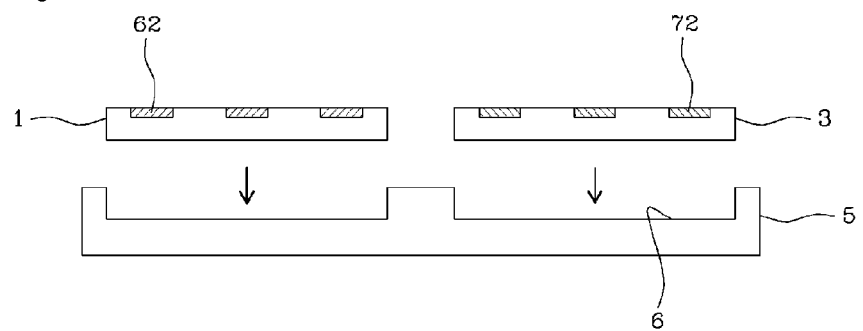
Figure 30:
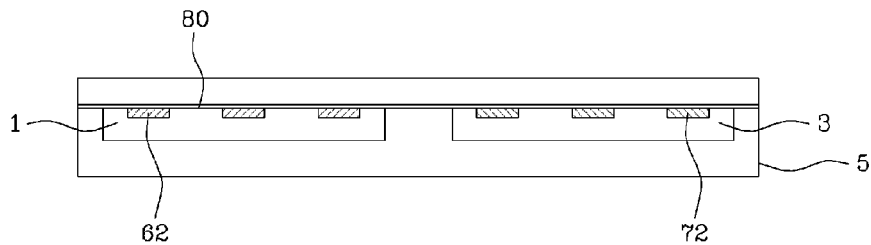
Figure 31:
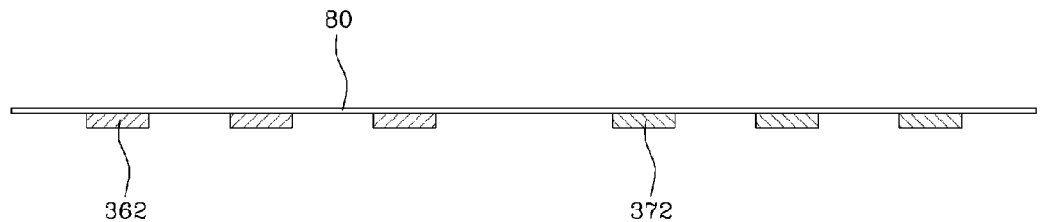

Subsequently, as illustrated in FIG. 29, a second mold 5 having cavities 6 in an arbitrary shape is prepared (S510), and the first molds having the molding materials charged in the cavities thereof are disposed in the cavities of the second mold, and as illustrated in FIG. 30, fabric 80 is placed on the upper surface of the first molds disposed in the cavities of the second mold, and the second mold is closed (S520). After the second mold is closed, the second mold is pressurized and heated so that the molding materials of the first molds in contact with the fabric penetrate into the surface and texture of the fabric. Accordingly, the molding materials that penetrate into the surface and texture of the fabric and the cavities of the first molds are integratedly attached to the fabric while being integratedly cross-linked. After the molding materials of the first molds are integrated with the fabric via penetration into the surface and texture of the fabric, pressure is released when cross-linking is completed, and the second mold is rapidly opened so that the molding materials of the first molds integrated with the fabric are foamed (S530). After completion of the foaming process, as illustrated in FIG. 31, a fabric-integrated foamed product is obtained, in which cross-linked foamed bodies 362, 372 formed in an arbitrary shape and having various colors and properties are provided on the surface of the fabric 80.

This embodiment may include providing a release means before the first molds filled with the molding materials are heated, and removing the release means after the first molds are opened, as in the above-mentioned embodiment. Specifically, providing the release means (S360, S460) may be performed upon charging the molding materials in the first molds (S322, S326, S422, S426), and the specific sequence of providing the release means may vary depending on the characteristics (solid phase or softening) of the first molding material, as mentioned above. After the release means is provided, it is preferred that removing the release means (S370, S470) be performed after S340 and S440 at which the molds are opened.

Also, in order to protect the fabric placed inside the molds from the applied heat, this embodiment does not exclude providing a fabric protection means between the fabric and the inner surface of the molds (S522) after the fabric is placed on the molds, and removing the fabric protection means (S532) after the molds are finally opened so that foaming is performed.

Also, in order to enhance the extent of adhesion between the fabric and the molding materials, this embodiment does not exclude providing an additional adhesion means between the molding material and the fabric before the fabric is placed on the upper surface of the molding materials.

Figure 32:
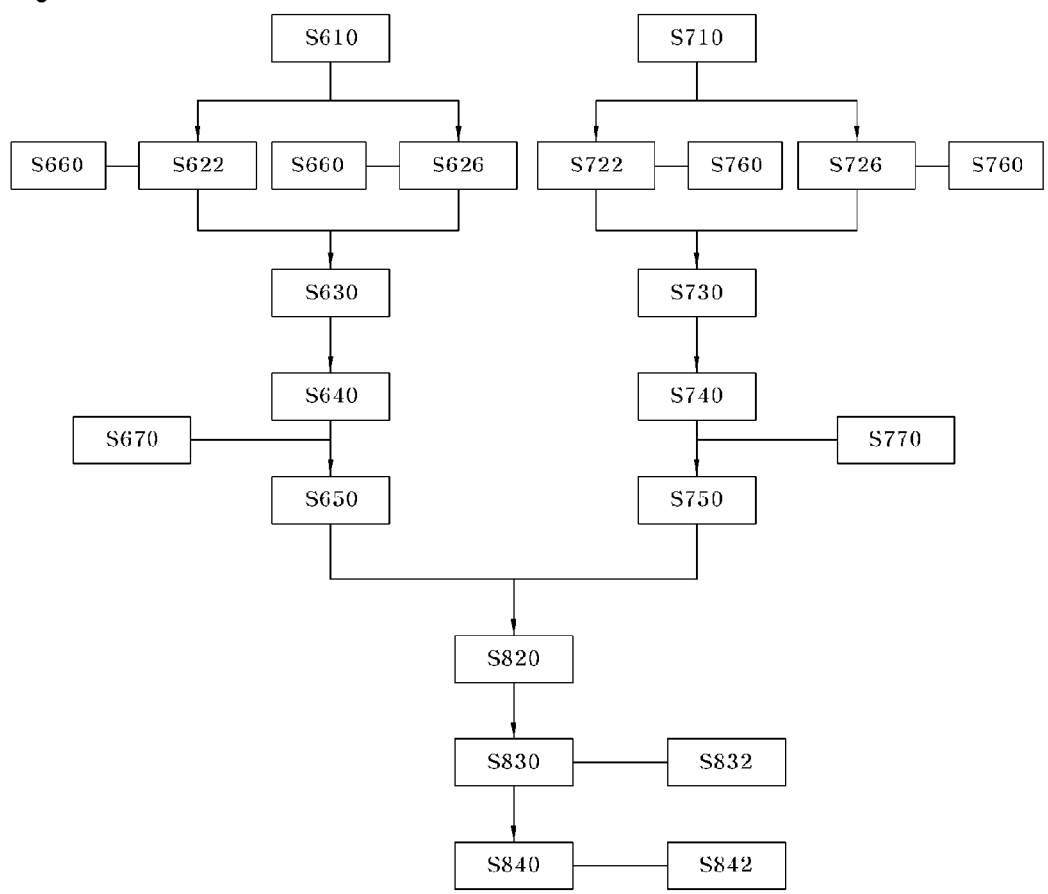
FIG. 32 schematically illustrates a manufacturing process according to a further embodiment of the present invention.

In addition, FIG. 32 illustrates a process of manufacturing a fabric-integrated cross-linked foamed product according to a further preferred embodiment of the present invention. This embodiment is different from the above-mentioned embodiment because a foamed product in which cross-linked foamed bodies having multiple colors and properties may be provided on both surfaces of fabric may be manufactured. A description of portions of this embodiment, which overlap with the above-mentioned embodiment or to which the description portions of the above-mentioned embodiment may be applied as they are, is omitted.

Figure 33:
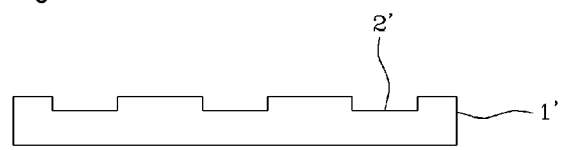
FIGS. 33 to 40 schematically illustrate some procedures of the process of FIG. 32.
Figure 36:
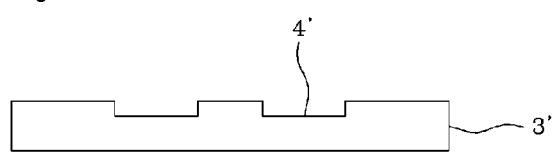

Specifically, at least two molds having cavities engraved in an arbitrary shape are prepared (S610, S710). The shape of the cavities of the molds is not limited, and it is apparent that the cavities have different shapes. FIGS. 33 and 36 illustrate two molds 1', 3' having cavities 2', 4' in different shapes.

Figure 34:
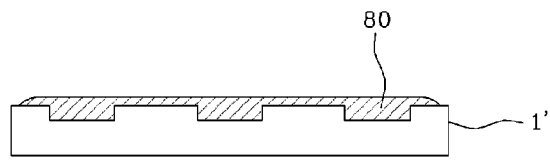
Figure 37:
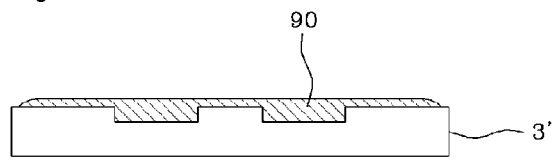

After preparation of the molds, as illustrated in FIGS. 34 and 37, the cavities of the molds are filled with molding materials 80, 90. The molding materials charged in the molds preferably have different colors, or different colors and properties. A process of filling the cavities with the molding materials may be divided into a case where the molding materials are in a solid phase (S622, S722), and a case where the molding materials in a solid phase are heated and softened (S626, S726), the description of which is the same as above.

Figure 35:
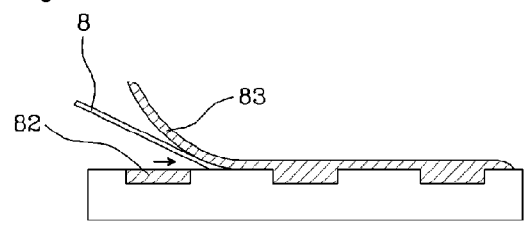
Figure 38:
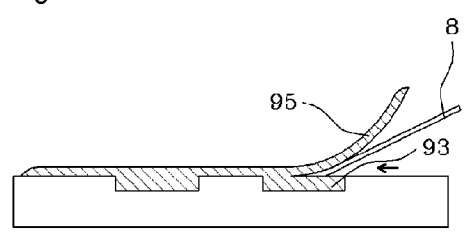

After filling of the cavities of the molds with the molding materials, the molds are closed, and then pressurized and heated so that the molding materials are melted (S630, S730), and after complete filling of the cavities of the molds with the melted molding materials, the molds are opened when the molding materials inside the molds begin to be cross-linked after having reached the softening temperature (S640, S740), and an excess of the molding materials which are located at positions other than the cavities of the molds are removed (S650, S750). As illustrated in FIGS. 35 and 38, an excess of unnecessary molding materials 83, 95 which are melted, other than the molding materials 82, 93 charged in the cavities, are removed using a removing means 8.

Figure 39:
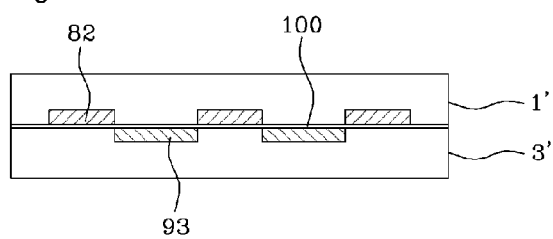
Figure 40:
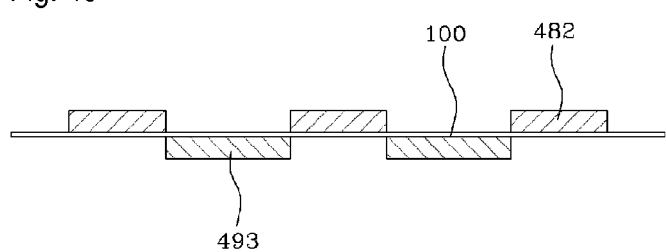

Subsequently, fabric is placed between the molds the cavities of which are filled with the molding materials (S820), and the molds are combined (S830). As illustrated in FIG. 39, combining the molds is performed so that the molding materials 82, 93 are alternately positioned to face each other while the fabric 100 is disposed therebetween. After the combined molds are closed, the combined molds are pressurized and heated so that the molding materials of the molds in contact with the fabric penetrate into the surface and texture of the fabric. Accordingly, the molding materials that penetrate into the surface and texture of the fabric and the cavities of the molds are integratedly attached to the fabric while being integratedly cross-linked. After the molding materials of the molds are integrated with the fabric via penetration into the surface and texture of the fabric, pressure is released when cross-linking is completed, and the combined molds are rapidly opened so as to foam the molding materials of the molds integrated with the fabric (S840). After completion of the foaming process, as illustrated in FIG. 40, a foamed product is obtained, in which cross-linked foamed bodies 482, 493 formed in an arbitrary shape and having various colors and properties are integratedly provided on both surfaces of the fabric 100.

This embodiment may include providing a release means before the molds filled with the molding materials are heated, and removing the release means after the molds are opened, as in the above-mentioned embodiment. Specifically, providing the release means (S660, S760) may be performed upon charging the molding materials in the molds (S622, S626, S722, S726), and the specific sequence of providing the release means may vary depending on the characteristics (solid phase or softening) of the first molding material, as mentioned above. After the release means is provided, it is preferred that removing the release means (S670, S770) be performed after S640 and S740 at which the molds are opened.

Also, in order to protect the fabric placed inside the molds from the applied heat, this embodiment does not exclude providing a fabric protection means between the fabric and the inner surface of the molds (S832) after the fabric is placed between the molds, and removing the fabric protection means (S842) after the molds are finally opened so that foaming is performed.

Also, in order to enhance the extent of adhesion between the fabric and the molding materials, this embodiment does not exclude providing an additional adhesion means between the molding material and the fabric before the fabric is placed on the upper surface of the molding material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a fabric-integrated cross-linked foamed product, comprising:
    preparing a mold having a cavity engraved in an arbitrary shape;
    filling the cavity of the mold with a molding material in an amount greater than a volume of the cavity of the mold;
    pressurizing and heating the mold;
    releasing pressure between when the molding material of the mold reaches a softening temperature by applied heat and when the molding material begins to be cross-linked, and opening the mold;
    completely removing the molding material other than the molding material charged in the cavity of the mold, of the melted molding material in the opened mold;
    placing fabric on an upper surface of the mold having the cavity filled with the molding material;
    pressurizing and heating the mold so that the molding material in contact with the fabric is cross-linked; and
    releasing pressure and rapidly opening the mold so as to foam the cross-linked molding material in contact with the fabric.

2. A method of manufacturing a fabric-integrated cross-linked foamed product, comprising:
    preparing a mold having a plurality of cavities engraved in an arbitrary shape;
    filling some of the cavities of the mold with a first molding material in an amount greater than a volume of the some cavities of the mold;
    pressurizing and heating the mold;
    releasing pressure between when the first molding material of the mold reaches a softening temperature by applied heat and when the first molding material begins to be cross-linked, and opening the mold;
    completely removing the first molding material other than the first molding material charged in the cavities of the mold, of the melted first molding material in the opened mold;
    filling empty cavities of the mold, which are not filled with the melted first molding material, with a second molding material having a different color or different color or properties from the first molding material;
    pressurizing and heating the mold;
    releasing pressure between when the second molding material reaches a softening temperature by applied heat and when the second molding material begins to be cross-linked, and opening the mold;
    completely removing the second molding material other than the second molding material charged in the cavities of the mold, of the melted second molding material in the opened mold;
    placing fabric on an upper surface of the mold having the cavities filled with the first molding material and the second molding material;
    pressurizing and heating the mold so that the first molding material and the second molding material which are in contact with the fabric are simultaneously cross-linked; and
    releasing pressure and rapidly opening the mold so as to foam the cross-linked first and second molding materials in contact with the fabric.

3. A method of manufacturing a fabric-integrated cross-linked foamed product, comprising:
    preparing a mold having a plurality of cavities engraved in an arbitrary shape;
    filling the cavities of the mold with a first molding material in an amount smaller than a volume of the cavities of the mold and then with a second molding material in an amount greater than a remaining volume of the cavities of the mold;
    pressurizing and heating the mold;
    releasing pressure between when the first molding material and the second molding material of the mold reach a softening temperature by applied heat and when the first molding material and the second molding material begin to be cross-linked, and opening the mold;
    completely removing the second molding material other than the second molding material charged in the cavities of the mold, of the melted second molding material in the opened mold;
    placing fabric on an upper surface of the mold having the cavities sequentially filled with the first molding material and the second molding material;
    pressurizing and heating the mold so that the first molding material and the second molding material which is in contact with the fabric are simultaneously cross-linked; and
    releasing pressure and rapidly opening the mold so as to foam the cross-linked first and second molding materials in contact with the fabric.

4. A method of manufacturing a fabric-integrated cross-linked foamed product, comprising:
    preparing at least two first molds having cavities engraved in an arbitrary shape;
    filling the cavities of the first molds with a molding material in an amount greater than a volume of the cavities of the first molds;
    pressurizing and heating the first molds;
    releasing pressure between when the molding material of the first molds reaches a softening temperature by applied heat and when the molding material of the first molds begins to be cross-linked, and opening the first molds;
    completely removing the molding material other than the molding material charged in the cavities of the first molds, of the melted molding material in the opened first molds;
    disposing the first molds having the cavities filled with the molding material in cavities having an arbitrary shape of a second mold;

placing fabric on an upper surface of the first molds having the cavities filled with the molding material and disposed in the cavities of the second mold;

pressurizing and heating the second mold so that the molding material of the first molds in contact with the fabric is simultaneously cross-linked; and releasing pressure and rapidly opening the second mold so as to simultaneously foam the cross-linked molding material of the first molds in contact with the fabric.

5. A method of manufacturing a fabric-integrated cross-linked foamed product, comprising:

preparing at least two molds having cavities engraved in an arbitrary shape;

filling the cavities of the respective molds with molding materials having different colors or different colors or properties in an amount greater than a volume of the cavities of the molds;

pressurizing and heating the molds;

releasing pressure between when the molding materials of the molds reach a softening temperature by applied heat and when the molding materials of the molds begin to be cross-linked, and opening the molds;

completely removing the molding materials other than the molding materials charged in the cavities of the molds, of the melted molding materials in the opened molds;

placing fabric on an upper surface of any one of the molds having the cavities filled with the molding materials;

combining the molds so that the molding materials charged in the cavities face each other while the fabric is disposed therebetween;

pressurizing and heating the combined molds so that the molding materials of the molds which are in contact with the fabric are simultaneously cross-linked; and releasing pressure and rapidly opening the combined molds so as to simultaneously foam the cross-linked molding materials of the molds in contact with the fabric.

6. The method of claim 4, wherein the molding material of each of the first molds has a different color or different color or properties.

7. The method of claim 1, further comprising providing a release means before heating the mold filled with the molding material, and removing the release means after opening the mold.

8. The method of claim 2, further comprising providing a release means before heating the mold filled with the first molding material, and removing the release means after opening the mold having the melted first molding material.

9. The method of claim 2, further comprising providing a release means before heating the mold filled with the first molding material and the second molding material, and removing the release means after opening the mold having the melted first molding material and second molding material.

10. The method of claim 4, further comprising providing a release means before heating the first molds filled with the molding material, and removing the release means after opening the first molds.

11. The method of claim 1, wherein the removing the molding material other than the molding material charged in the cavity of the opened mold is performed by maintaining the mold at a predetermined temperature or by cooling the mold and then using a removing means at a high temperature.

12. The method of claim 2, wherein the removing the first molding material or the second molding material other than the first molding material or the second molding material charged in the cavities of the opened mold is performed by maintaining the mold at a predetermined temperature or by cooling the mold and then using a removing means at a high temperature.

13. The method of claim 4, wherein the removing the molding material other than the molding material charged in the cavities of the opened first molds is performed by maintaining the first molds at a predetermined temperature or by cooling the first molds and then using a removing means at a high temperature.

14. The method of claim 1, further comprising providing a fabric protection means between the mold and the fabric before placing the fabric.

15. The method of claim 1, further comprising providing an adhesion means between the molding material and the fabric before placing the fabric.

16. The method of claim 3, wherein the filling the cavities of the mold with the first molding material and the second molding material is performed by filling some of the cavities of the mold with the first molding material in an amount smaller than the volume of the some cavities, and charging the second molding material in all of the cavities which are not filled with the first molding material and the cavities which are partially filled with the first molding material.

17. The method of claim 5, further comprising providing a release means before heating the mold filled with the molding material, and removing the release means after opening the mold.

18. The method of claim 5, wherein the removing the molding material other than the molding material charged in the cavity of the opened mold is performed by maintaining the mold at a predetermined temperature or by cooling the mold and then using a removing means at a high temperature.

19. The method of claim 2, further comprising providing a fabric protection means between the mold and the fabric before placing the fabric.

20. The method of claim 3, further comprising providing a fabric protection means between the mold and the fabric before placing the fabric.

21. The method of claim 4, further comprising providing a fabric protection means between the mold and the fabric before placing the fabric.

22. The method of claim 5, further comprising providing a fabric protection means between the mold and the fabric before placing the fabric.

23. The method of claim 2, further comprising providing an adhesion means between the molding material and the fabric before placing the fabric.

24. The method of claim 3, further comprising providing an adhesion means between the molding material and the fabric before placing the fabric.

25. The method of claim 4, further comprising providing an adhesion means between the molding material and the fabric before placing the fabric.

26. The method of claim 5, further comprising providing an adhesion means between the molding material and the fabric before placing the fabric.

* * * * *